(12) United States Patent
Worrell et al.

(10) Patent No.: US 6,497,443 B2
(45) Date of Patent: Dec. 24, 2002

(54) RECONFIGURABLE CONSOLE

(75) Inventors: Barry C. Worrell, Centerville, OH (US); Kenneth A. Gassman, Springboro, OH (US); Joshua A. Williams, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/947,654

(22) Filed: Sep. 6, 2001

(65) Prior Publication Data

US 2002/0175531 A1 Nov. 28, 2002

Related U.S. Application Data

(60) Provisional application No. 60/292,619, filed on May 22, 2001.

(51) Int. Cl.[7] ................................................. B60R 7/00
(52) U.S. Cl. ...................... 296/37.8; 296/65.03; 348/837
(58) Field of Search .............................. 296/37.8, 37.12, 296/37.14, 65.03, 37.15; 224/400, 275, 483, 545, 555; 348/837; 248/919, 920, 922, 923

(56) References Cited

U.S. PATENT DOCUMENTS

| | | | | | |
|---|---|---|---|---|---|
| 4,545,211 A | * | 10/1985 | Gaus | ........................ | 296/37.8 |
| 5,106,143 A | * | 4/1992 | Soeters | .................. | 296/37.8 X |
| 5,149,572 A | * | 9/1992 | Gaggero et al. | ............. | 428/43 |
| 5,177,616 A | * | 1/1993 | Riday | ........................ | 348/837 |
| 5,311,302 A | * | 5/1994 | Berry et al. | ............. | 348/14.03 |
| 5,338,081 A | * | 8/1994 | Young et al. | ............. | 296/37.14 |
| 5,397,160 A | * | 3/1995 | Landry | ...................... | 296/37.8 |
| 5,492,068 A | * | 2/1996 | McKee | .................. | 296/37.8 X |
| 5,551,616 A | * | 9/1996 | Stitt et al. | .................... | 224/275 |
| 5,709,360 A | * | 1/1998 | Rosen | ...................... | 248/278.1 |
| 6,068,129 A | * | 5/2000 | Chen | ........................ | 296/37.8 |
| 6,129,400 A | * | 10/2000 | Jakubiec et al. | ......... | 296/37.14 |
| 6,158,795 A | * | 12/2000 | Gray et al. | ................. | 296/37.8 |
| 6,278,676 B1 | * | 8/2001 | Anderson et al. | .......... | 296/37.8 |
| 6,279,977 B1 | * | 8/2001 | Chen | ........................ | 296/37.8 |
| 6,338,429 B1 | * | 1/2002 | Pesce | ........................ | 224/275 |
| 6,347,590 B1 | * | 2/2002 | D'Annunzio et al. | ......... | 108/25 |
| 6,354,649 B1 | * | 3/2002 | Lee | ........................ | 296/37.8 X |
| 6,367,857 B2 | * | 4/2002 | Kifer et al. | ............ | 296/37.8 X |
| 2001/0011664 A1 | * | 8/2001 | Meritt | ........................ | 224/275 |

FOREIGN PATENT DOCUMENTS

JP            200155091 A     *    2/2001

* cited by examiner

*Primary Examiner*—D. Glenn Dayoan
*Assistant Examiner*—Jason Morrow
(74) *Attorney, Agent, or Firm*—Kathryn A. Marra

(57) ABSTRACT

A multipurpose console for use in a vehicle, the console has an upper portion and a lower portion. A pair of mounting flanges are fixedly secured to the lower portion, the mounting flanges each having a plurality of openings to allow a mounting member of a vehicle seat to pass therethrough. The multipurpose console is releasably secured to the vehicle through the securement of a removable seat having a locking mechanism passing through one of the plurality of openings and the pair of mounting flanges. The console includes many features that can be sold as part of the console or be added on at a later time. The console fits between the two middle row seats and extends up between the two front row seats. The unit can be mounted into the vehicle by placing the side flange holes over the seat floor attachment then adding the seats which snap into the floor inside these two holes on the center side of both middle row seat.

15 Claims, 5 Drawing Sheets

RECONFIGURABLE CONSOLE

CROSS REFERENCE TO RELATED APPLICATIONS

This application claims the benefit of U.S. provisional patent application No. 60/292,619 filed on May 22, 2001 the contents of which are incorporated herein by reference thereto.

TECHNICAL FIELD

The present invention is related generally to a multipurpose/reconfigurable console and more particularly, a multipurpose console for vehicle applications.

BACKGROUND

Some vehicles, particularly larger sized vehicles, have removable bucket seats for altering the seating arrangements and storage areas of the vehicle in accordance with the user's preference.

These removable seats each have a latching mechanism for securing and engaging a latching mechanism such as a mounting member fixedly secured to the vehicle floor or frame. The latching mechanisms each have an associated spring-loaded latching mechanism for anchoring the seats in place.

The vehicle seats can be easily removed by depressing a latching lever and lifting the seats from the mounting brackets in the floorboard of the vehicle. In some applications, several such seats are mounted to the vehicle, particularly in the second and third rows of seats.

SUMMARY OF THE INVENTION

A removable floor-mounted multipurpose console that utilizes the securement means of a removable seat. The console can be removably attached in a location in between a pair of side-by-side seats. The removable floor-mounted console provides a variety of console accessories.

This console extends up higher between two second row seats and is disposed between passengers seated therein. This extension can house a variety of features, such as a fold out lap tray on each side, storage rack: for books and/or toys, drawers, fold-out personal electronic TV/VCR, etc.

An alternative console extension is designed to be removable and the features will depend on the individual needs. The removable nature of the upper console allows this unit to serve as a portable storage/activity center during extended travel.

Another alternative includes an extendable unit mounted to a track system for fore/aft adjustability. The aft adjustment would provide 3rd row occupants access to the unit. The fore adjustment would provide front row occupants access to the extendable unit.

In other embodiments the units re-configurability is designed to satisfy different occupant needs and these designs are bundled together. Some of the different market focuses anticipated are infant care, small child, school age kids, business office, personal/cosmetic care, etc. Each specific target market would have unique and common features bundled into the units. These units would also be branded according to the target.

The above-described and other features and advantages of the present invention will be appreciated and understood by those skilled in the art from the following detailed description, drawings, and appended claims.

DETAILED DESCRIPTION OF THE PREFERRED EMBODIMENT

Figure 1:
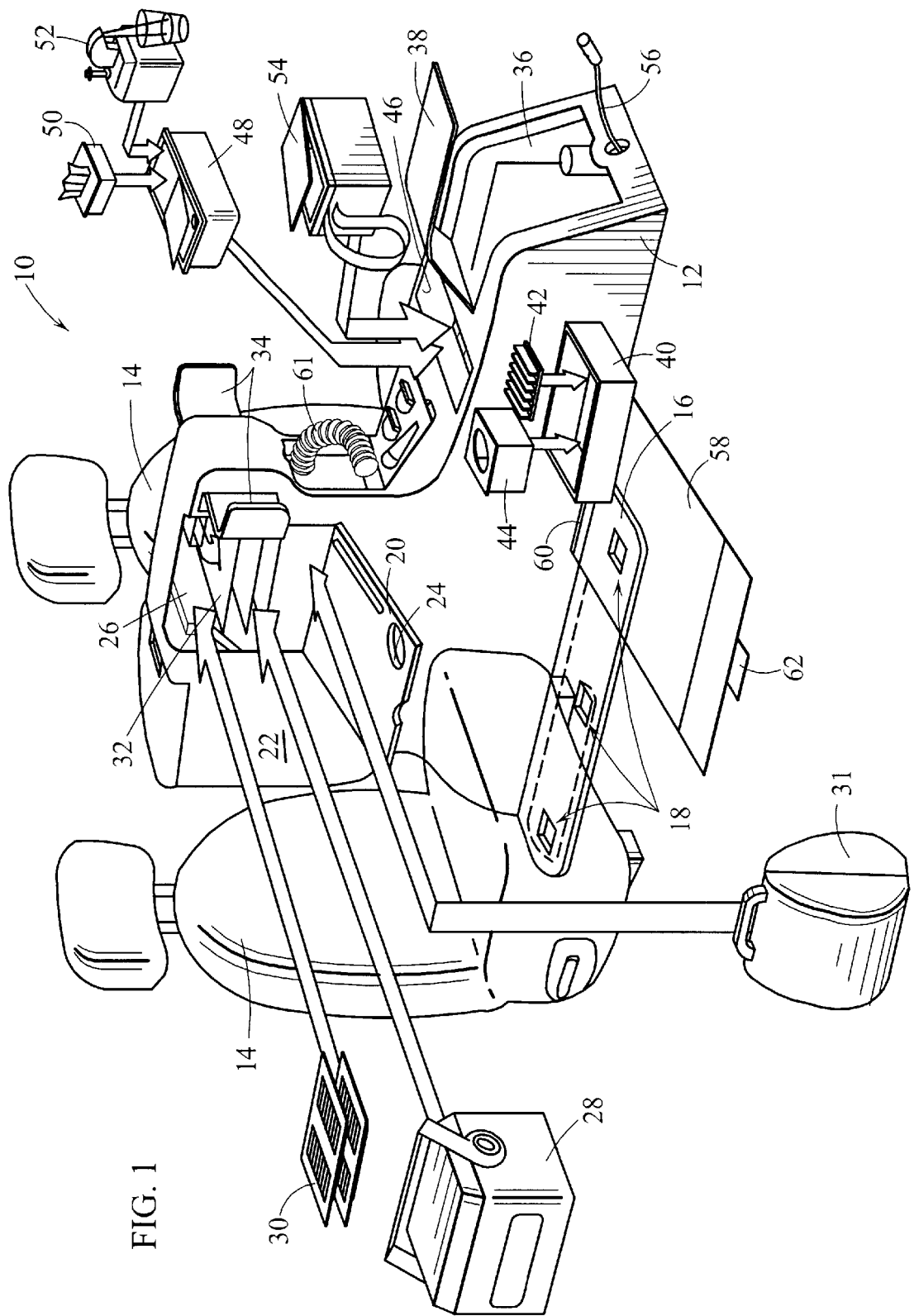
FIG. 1 is a perspective view of a multipurpose console constructed in accordance with the present invention.

Referring now to FIG. 1, a reconfigurable console 10 constructed in accordance with an exemplary embodiment of the present invention is illustrated. Reconfigurable console 10 provides amenities and features for occupants of a vehicle.

Console 10 is constructed out of a durable, lightweight; easily-molded material such as plastic or the like and generally has an elongated base portion 12 that is positionable between a pair of seats 14. The console is capable of being molded in a variety of colors and textures for matching vehicle interiors. In accordance with an exemplary embodiment, seats 14 are removable/repositionable seats typically used in vehicles and oversized vehicles having multiple rows of seats such as vans, minivans, sport utility vehicles and the like.

Elongated base portion 12 includes a pair of mounting flanges 16. Mounting flanges 16 depend outwardly from a lower portion of base portion 12. Mounting flanges 16 are fixedly secured to base portion 12. Each mounting flange 16 is configured to have a plurality of mounting apertures 18. Mounting apertures 18 and the point of securement of mounting flange 16 to lower base portion 12 allows apertures 18 to align with a securement means configured for engaging a complementary securement means of seats 14.

Accordingly, and in order to secure repositionable console 10 within a vehicle, seats 14 are removed and console 10 is positioned within the vehicle so as to align apertures 18 with the securement means located on the floor of the vehicle. Apertures 18 are sufficiently large enough to allow seats 14 to engage and secure themselves to the mounting means located on the floor of the vehicle. Thus, once console 10 is positioned in the desired location the securement of seats 14 to the vehicle causes console 10 to be fixedly secured therein.

In addition, mounting flange 16 has a planar configuration and is configured to have a substantially low profile so there is no interference with the securement of seats 14 to the vehicle.

The console includes many features that can be sold as part of the console or be added on at a later time.

The console is configured to fit between the two middle row seats and extends up between the two front row seats. The unit can be mounted into the vehicle by placing the side flange holes over the seat floor attachment then adding the seats which snap into the floor inside these two holes on the center side of both middle row seat.

Accordingly, no design modifications are necessary for securement of reconfigurable console 10 within a vehicle.

Thus, console 10 is capable of being sold as an aftermarket item or as an option during vehicle purchase.

As an alternative, there are also additional holes in the flange that allows the unit to be located rearward in the vehicle such that the third row passenger could utilize features, such as the video screens of the unit. This prevents the need for having any special attachment provisions in the vehicle and allows this unit to be sold as an aftermarket item.

In addition, console 10 is capable of being installed in a rearward or forward facing manner, with respect to the vehicle orientation, so as to provide amenities to a pair of seats that are facing either rearwardly or forwardly.

Console 10 is provided with a plurality of amenities/features for use by the occupants of the vehicle. A foldout tray portion 20 is configured to deploy from an upper portion 22 of console 10. In a deployed position tray 20 is positioned for an occupants seated within seat 14. In addition, tray portion 20 includes a cup holder 24. Cup holder 24 is configured to engage and retain a portion of a cup or soda can. In addition, and when tray portion 20 is in its deployed position illustrated in FIG. 1 access is provided to an interior compartment 26 of upper portion 22.

Interior compartment 26 provides a storage area for items such as a removable cooler 28 and/or trays 30 for food, toys and games etc. Also, personal items such as a purse 31 is capable of being stored within interior compartment 28. Interior compartment 28 is also configured to have a plurality of shelves 32 for receiving the aforementioned items.

In addition, it is noted that upper portion 22 is configured to have a pair of tray portions 20 that are configured to depend outwardly from either side of upper portion 22.

Upper portion 22 is also configured to have a pair of pullout TV screens or liquid crystal displays 34 capable of being electrically connected to electronic device for playing entertainment media such as compact discs and digital videodiscs. The electronic device may be a hand-held item or alternatively a device is configured to be integral with console 10.

This console extends up higher between the two middle row seats, thus allowing access to the pull out trays and the individual TV monitors. Since the individual TV monitors are closer to the passengers console 10 allows the use of smaller cheaper screens for example a 2.5" monitor. This allows packaging of more screens at a much lower cost than for example, a single 5–7" flat panel display.

Portion 12 is configured to have a forward storage compartment 36. Forward storage compartment 36 is accessible through an access door 38.

In addition, portion 12 includes a drawer portion 40 which provides a means for storing items such as compact discs and/or digital videodiscs. A compact disc retaining device 42 is configured for insertion into a portion of drawer portion 40. A removable garbage receptacle 44 is also configured for insertion into drawer portion 40.

A receiving area 46 is positioned on the upper surface of portion 12. Receiving area 46 is configured to receive an engage a removable bin or tray 48. Tray 48 is configured to have a plurality of receiving areas for receiving engageable items such a tissue dispenser 50 and/or a water dispenser 52.

Alternatively, a thermal container 54 is configured for receipt into receiving area 46. Thermal container 54 includes an interior portion which is accessible through a lid portion and has at least one thermal electric device for either heating or cooling the internal compartment of container 54. Thermal container 54 is electrically coupled to the vehicle's electrical system through a power cord 56 which is configured to be electrically coupled to a power outlet such as a cigarette lighter attachment or directly wired to the vehicle's fuse box or electrical system.

A deployable mat or diaper changing surface 58 is configured for deployment out of an elongated opening 60 of lower portion 12. One end of mat 58 is configured for being grasped by the hands of an individual while the other end is fixedly secured to a retractable tensioning mechanism such as a spring wound roller similar to a window shade that allows mat 58 to be deployed and retracted back into elongated opening 60 so that only a portion or the grasping portion of mat 58 is exposed through opening 60. Alternatively, a tab 62 is secured to the grasping portion of mat 58. Tab 62 will project outwardly from opening 60 when mat 58 is fully inserted therein.

A vacuum cleaner 61 is located within console 10. Vacuum cleaner 61 is battery-powered or operable from an electrical source supplied by power cord 56. In addition, vacuum cleaner 61 is either fixedly secured within console 10 or removably stowed within a receiving area of console 10. If vacuum cleaner 61 is fixedly secured within console 10, a removable receptacle or bag for collecting debris is located within a convenient access port of console 10. In addition, and in the case of a fixedly secured vacuum, console 10 is provided with a plurality of vacuum ports for fluid communication with vacuum cleaner 61.

Figure 2:
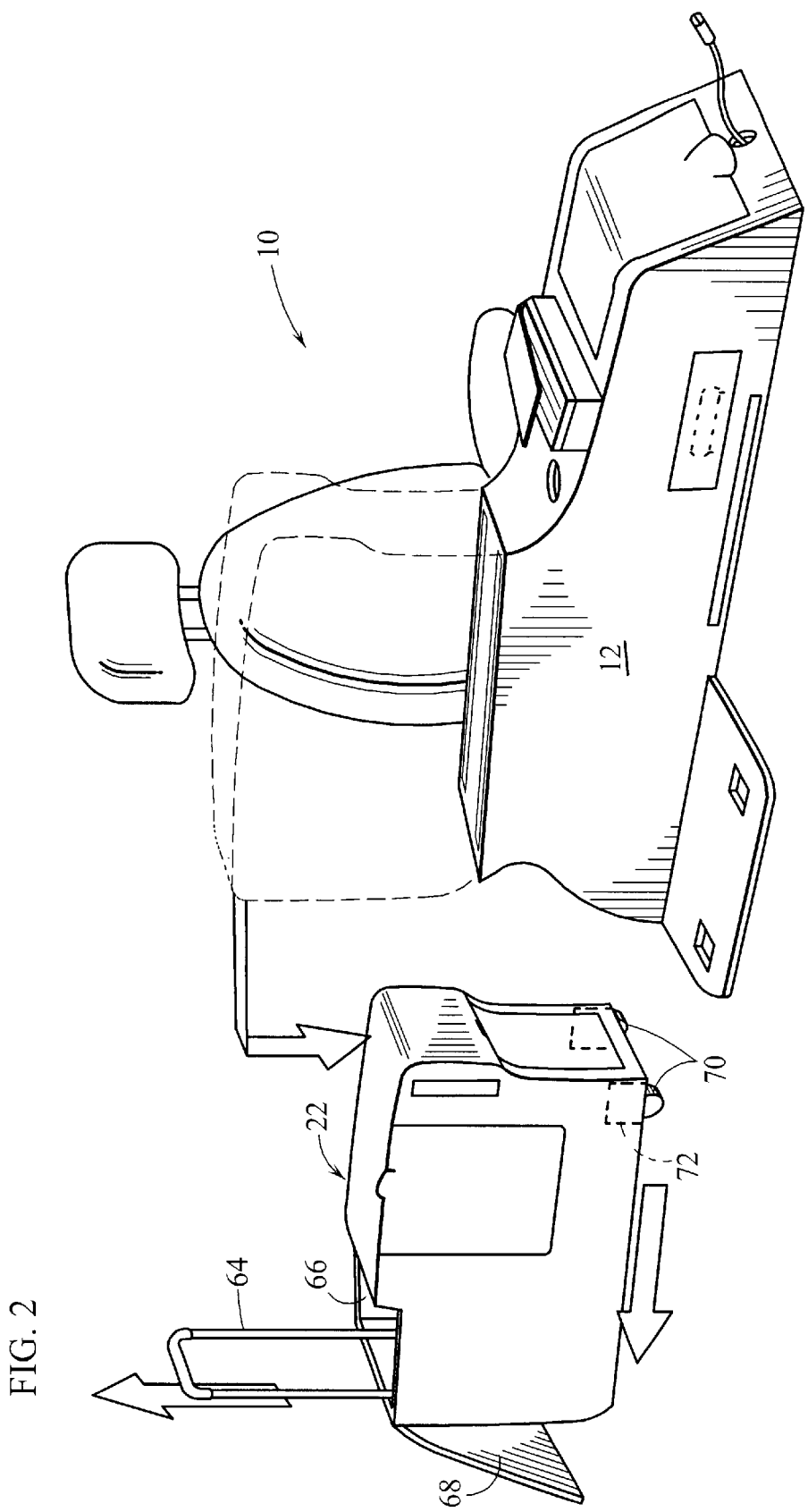
FIG. 2 is a perspective view of an alternative multipurpose console constructed in accordance with an exemplary embodiment of the present invention.

Referring now to FIG. 2, an alternative embodiment of the present invention is illustrated. Here upper portion 22 is removably securable to lower elongated portion 12. Accordingly, upper portion 22 is transportable and may be used for excursions outside of the vehicle into which console 10 is installed. In this embodiment, a deployable handle 64 is configured for deployment out of an internal compartment 66. A lid portion 68 covers internal compartment 66 when handle 64 is stowed therein.

In addition to having a latching means for securing portion 12 to a lower surface of upper portion 22, the lower surface of portion 22 is fitted with a pair of deployable wheels 70. Deployable wheels 70 allow an individual to pull portion 22 along a surface by applying a force to handle 64.

Deployable wheels 70 are spring biased for retraction into a wheel bay 72 located on the lower surface of portion 22. Thus, when upper portion 22 is reattached to lower portion 12 wheels 70 are retracted into bays 72.

Figure 3:
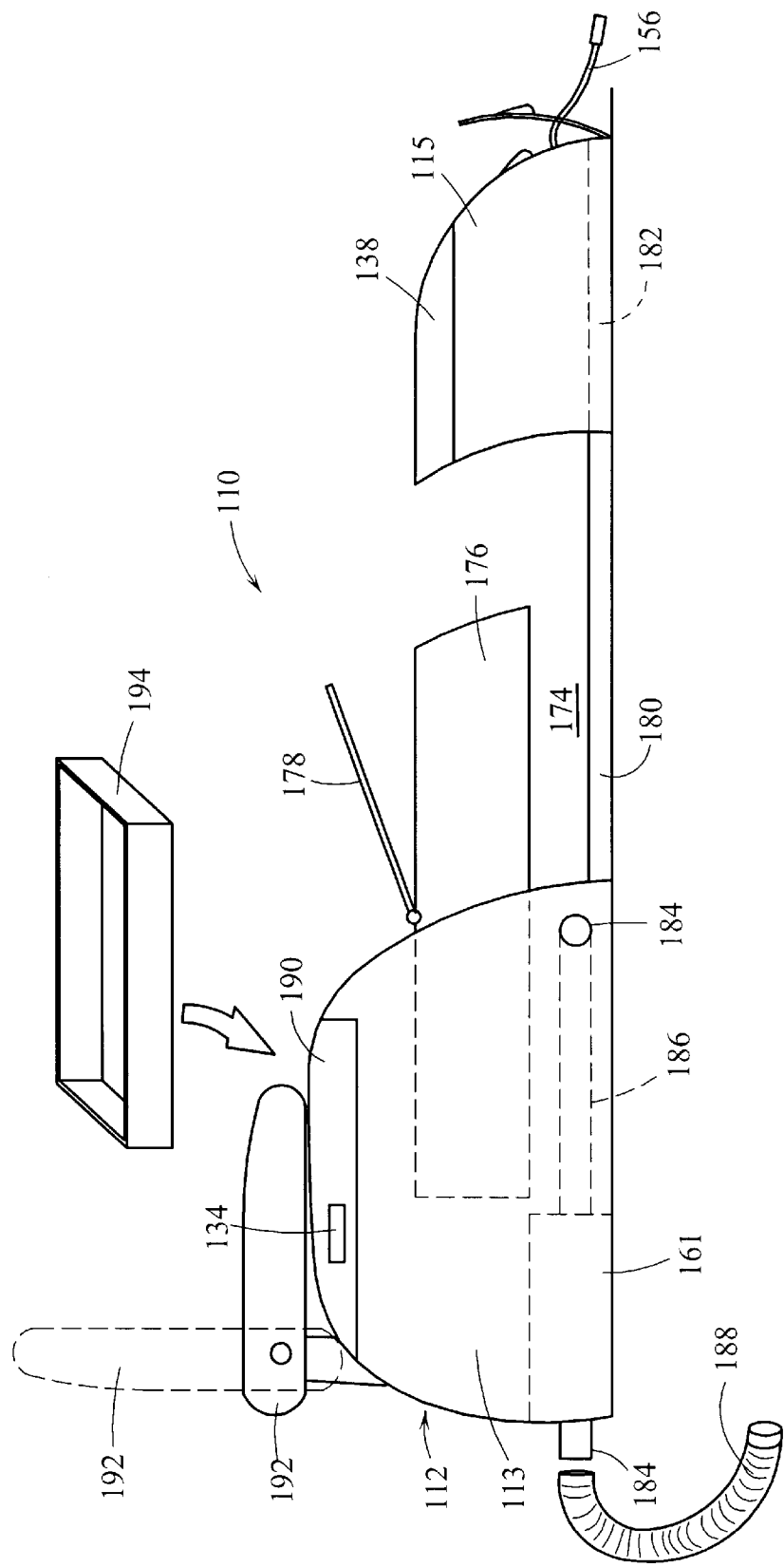
FIG. 3 is a side view illustrating features of an alternative multipurpose console.

Referring now to FIG. 3, another alternative embodiment of the present invention is illustrated. Here component parts performing similar or analogous functions are labeled in multiples of 100. In this embodiment reconfigurable console 110 includes an elongated base portion 112. The elongated base portion 112 has a fixed member or portion 113 and a slidable member or portion 115. As illustrated in FIG. 3 slidable member 115 is positioned in a deployed position. In accordance with an exemplary embodiment, the deployed position of slidable member 115 locates the same between the next successive pair of seats in the vehicle. For example, if fixed member 113 is positioned in between the middle row of passenger seats then the deployed position of member 115 will locate it in between the driver's seat and the front passenger side seat.

Slidable member 115 includes an access door or lid 138 for access into the internal compartment of member 115. Once in the deployed position as illustrated in FIG. 3, slidable member 115 is in a spacing faced relationship with respect to fixed member 113. Accordingly, a space or opening 174 is defined between movable member 115 and fixed member 113. Space 174 provides an area of deployment for a bin 176 to slide from a stowed position within fixed member 113 to a deployed position illustrated in FIG. 3. Bin 176 includes a lid portion 178 pivotally secured to bin 176. The portion provides access to an internal compartment of bin 176 once bin 176 is in the deployed position illustrated in FIG. 3. In an exemplary embodiment, bin 176 is an electrically heated/cooled container having a thermal electric device for providing heating and/or cooling to bin 176. The thermal electric device receives its power from the vehicle via a power cord 156.

Movable member 115 is positionable into the deployed position illustrated in FIG. 3 by sliding along a guide rail 180 or pair of guide rails 180 of a track system. Guide rail 180 is received within a guide opening 182 in movable member 115. In addition, fixed member 113 includes a plurality of vacuum ports 184. Vacuum ports 184 are connected to an internal vacuum cleaner 161 through a conduit or conduits 186. Vacuum ports 184 provide the means for securing a vacuum hose 188 to vacuum 161. Vacuum hose 188 is stowable in an internal compartment of console 110. Accordingly, an individual can vacuum the interior of the vehicle by simply connecting vacuum hose 188 to one of the vacuum ports. Once the task is completed the hose is then stored within console 110.

As an alternative, movable member 115 is positioned for rearward movement from fixed member 113 allowing individuals in a third row of seats access to movable member 115. In yet another alternative, console 110 is provided with a pair of movable members 115, one for forward movement and one for rearward movement.

Fixed portion 113 includes an upper lid portion 190 pivotally secured to fixed portion 113. In exemplary embodiment, upper lid portion 190 is manufactured with an aesthetically pleasing soft layer molded out of a urethane or thermoplastic material.

An arm arrest portion 192 is also pivotally secured to fixed member 113. Arm arrest portion 192 is positionable for movement between a first position and a second position as illustrated by the dashed lines in FIG. 3.

Upper lid portion 190 includes a pair of deployable viewing screens 134. Viewing screens 134 are deployable out of upper lid portion 190 and are configured to receive a video signal from an electronic device such as a portable digital videodisc player.

Figure 4:
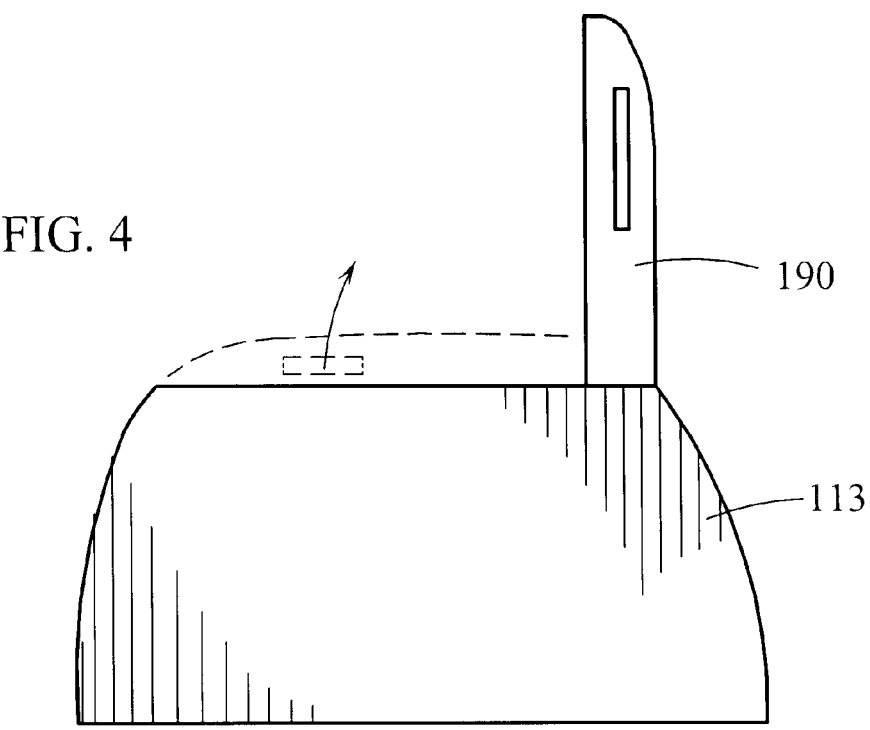
FIG. 4 is a perspective view illustrating features of an alternative multipurpose console.
Figure 5:
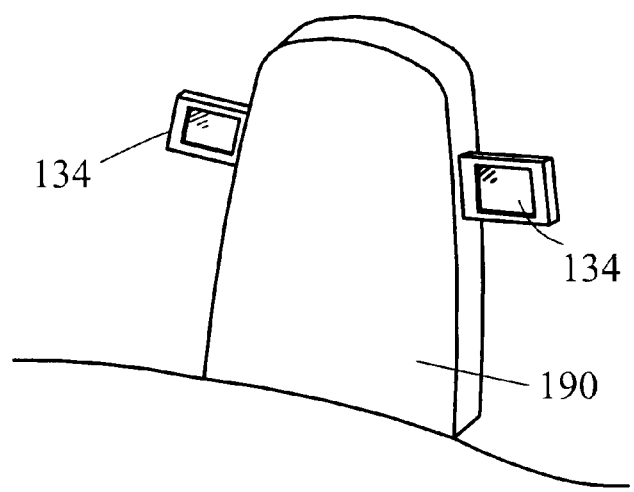
FIG. 5 is a side view illustrating features of an alternative multipurpose console.

In order to deploy the viewing screens, so that they may be properly viewed by vehicle occupants, armrest 192 must first be positioned into the upper position illustrated by the dashed lines in FIG. 3 and lid portion 190 is positioned into a open configuration as illustrated in FIG. 4. Once in this position the viewing screens 134 can be deployed as illustrated in FIG. 5.

Referring back now to FIG. 3, a removable storage tray 194 is also insertable into fixed member 113.

Figure 6:
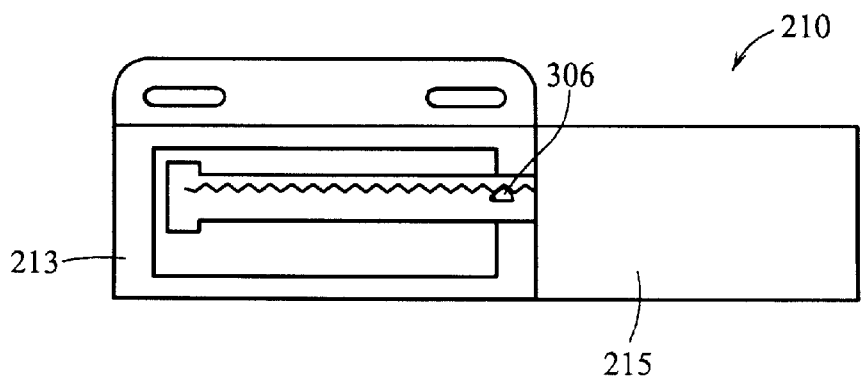
FIGS. 6–8 are side views of an alternative multipurpose console.
Figure 7:
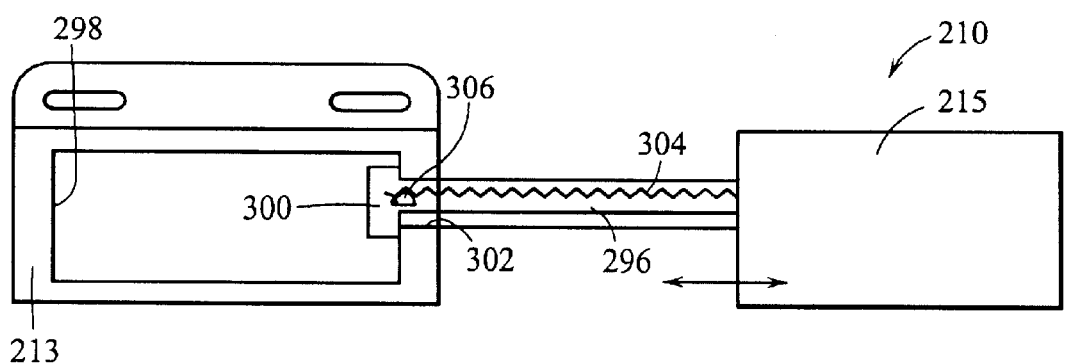
Figure 8:
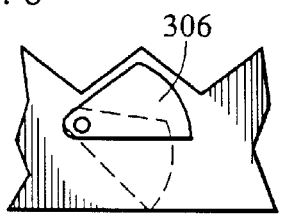

Referring now to FIGS. 6–8, another alternative embodiment of the present invention is illustrated. Here a reconfigurable console 210 includes a fixed portion 213 and a movable portion 215. Movable portion or front console 215 is movably coupled to fixed portion or rear console 213 by an elongated member 296. In an exemplary embodiment, elongated member 296 is as long as the rear unit. Of course, other lengths for elongated member 296 are contemplated for use with the present invention.

The elongated member 296 is fixedly secured to front console 215 at one end and is movably received within an opening 298 in rear console 213. Elongated member 296 has an end portion 300. End portion 300 is larger than an opening 302 in fixed member 213. Accordingly elongated member 296 allows front console 215 to move away from or into an open position (as illustrated in FIG. 7) until end portion 300 makes contact with opening 302.

In addition, elongated member 296 is configured with an inner opening having an engagement surface 304. Engagement surface is configured with a plurality of notches for engaging a ratcheting member 306 (FIG. 8). Alternatively, engagement surface 304 may be positioned on an exterior surface of elongated member 296.

Ratcheting member 306 is configured to engage the notches of engagement surface 304. Ratcheting member 306 is positioned within opening 302 in order to engage notches 304 as front console 215 is repositioned with respect to rear console 213. Ratcheting member 306 is pivotally secured to a portion of opening 302 and is spring biased to allow for the pivotal movement of ratcheting member 306.

Accordingly, and as front console 215 is moved away from rear console 213 ratcheting member 306 secures front console 215 incrementally as it is moved to away from rear console 213. The incremental securement of front console 215 occurs until a point of maximum deployment. At a point of maximum deployment end portion 300 makes contact with opening 302 (FIG. 7). In order to release front console 215 and secure it back to the closed position (FIG. 6) a means for biasing ratchet member 306 into a non-engaging positioned (illustrated in the dashed lines of FIG. 8) is provided to overcome the spring biasing force of ratcheting member 306. The means for biasing ratchet member 306 preferably includes a pushbutton device located on an upper surface of console 210 for biasing matching member 306.

Reconfigurable console 210 allows front passengers to access the middle row of a vehicle when the console is positioned as illustrated in FIG. 6. In addition, a passenger may even be able to travel towards the rear of the vehicle without having to exit the vehicle as the position in FIG. 6 will allow access to the rear portions of the same. Once the console is deployed into the position illustrated in FIG. 7, the front console 215 is now positioned in between the front the seats and is easily accessible by the occupants on the front two seats. Accordingly, reconfigurable console 210 allows for multiple configurations and or uses.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multipurpose console for use in a vehicle, comprising:
   a) an upper portion and a lower portion; and
   b) a pair of mounting flanges being fixedly secured to said lower portion, said pair of mounting flanges each having a plurality of openings configured to allow a mounting member of a vehicle seat to pass therethrough, said multipurpose console being releasably secured to the vehicle through the securement of a removable seat having a locking mechanism passing through one of said plurality of openings and said pair of mounting flanges.

2. The multipurpose console as in claim 1, wherein said pair of flanges of said multipurpose console are releasably secured to the vehicle through the securement of a pair of removable side by side seats each having a locking mechanism passing through one of said plurality of openings and said pair of mounting flanges.

3. The multipurpose console as in claim 2, wherein said upper portion is located at a torso level of an occupant seated in one of said removable seats.

4. The multipurpose console as in claim 3, wherein said upper portion includes a pair of deployable video screens, said pair of deployable video screens are positionable from a retracted position and a deployed position, said deployed position locating said video screen in a viewing position in front of an occupant seated in one of said removable seats.

5. The multipurpose console as in claim 4, wherein said pair of deployable video screens are 2.5 inches as measured diagonally.

6. The multipurpose console as in claim 3, wherein said upper portion includes a pair of deployable trays, said pair of deployable trays being positionable from the retracted position to a deployed position, said deployed position locating said tray in front of a lap of an occupant seated in one of said removable seats.

7. A multipurpose console for use in a vehicle, comprising:
   a) an upper portion and a lower portion; and
   b) a pair of mounting flanges being fixedly secured to said lower portion, said pair of mounting flanges each having a plurality of openings configured to allow a mounting member of a vehicle seat to pass therethrough, said multipurpose console being releasably secured to the vehicle through the securement of a removable seat having a locking mechanism passing through one of said plurality of openings and said pair of mounting flanges, wherein said lower portion includes a deployable mat, said deployable mat being retractable within an opening of said lower portion.

8. A multipurpose console for use in a vehicle, comprising:
   a) an upper portion and a lower portion; and
   b) a means for mounting said lower portion between a pair of removable seats of said vehicle, said upper portion is located at a torso level of an occupant seated in one of said removable seats; and
   c) a pair of deployable video screens being mounted for deployment out of said upper portion in a lateral direction, said pair of deployable video screens are positionable from a retracted positioned and a deployed position, said deployed position locating said video screen in a viewing position in front of an occupant seated in one of said removable seats.

9. A method of installing a multipurpose console in a vehicle, comprising:
   positioning a lower portion of the multipurpose console on a floor of the vehicle such that apertures defined in said lower portion align with first securement means located on said floor of the vehicle; and
   engaging second securement means of a first removable seat with said first securement means through said apertures such that the multipurpose console and said first removable seat are secured in the vehicle.

10. The method as in claim 9, further comprising:
    securing a first mounting flange to said lower portion such that said first mounting flange depends outwardly from the multipurpose console in a first direction, at least one of said apertures being defined in said first mounting flange.

11. The method as in claim 10, wherein said mounting flange has a planar configuration.

12. The method as in claim 10, wherein said mounting flange is configured such that the mounting flange does not interfere with securing said removable seat in said vehicle.

13. The method as in claim 10, further comprising:
    securing a second mounting flange to said lower portion that said second mounting flange depends outwardly from the multipurpose console in a second direction, at least one of said apertures being defined in said second mounting flange.

14. The method as in claim 13, further comprising:
    engaging second securement means of a second removable seat with said first securement means through said apertures such that said base portion and said second removable seat are fixedly secured in the vehicle.

15. The method as in claim 10, wherein said apertures are arranged such that said base portion is installable in a forward facing manner or a rearward facing manner with respect to an orientation of the vehicle.

* * * * *